(12) United States Patent
Koeberl et al.

(10) Patent No.: US 9,395,993 B2
(45) Date of Patent: Jul. 19, 2016

(54) EXECUTION-AWARE MEMORY PROTECTION

(71) Applicants: Patrick Koeberl, Alsbach-Haenlein (DE); Steffen Schulz, Darmstadt (DE)

(72) Inventors: Patrick Koeberl, Alsbach-Haenlein (DE); Steffen Schulz, Darmstadt (DE)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 13/952,849

(22) Filed: Jul. 29, 2013

(65) Prior Publication Data
US 2015/0032996 A1    Jan. 29, 2015

(51) Int. Cl.
G06F 12/14 (2006.01)
G06F 9/38 (2006.01)

(52) U.S. Cl.
CPC ............ *G06F 9/3802* (2013.01); *G06F 9/3824* (2013.01); *G06F 12/1441* (2013.01)

(58) Field of Classification Search
CPC ...................................................... G06F 12/14
See application file for complete search history.

(56) References Cited

U.S. PATENT DOCUMENTS

| 6,745,307 B2 * | 6/2004 | McKee ............... G06F 12/1491 711/163 |
| 2006/0149911 A1 | 7/2006 | Kimelaman et al. |
| 2008/0244155 A1 | 10/2008 | Lee et al. |
| 2008/0276051 A1 | 11/2008 | Renno |
| 2009/0113141 A1 | 4/2009 | Bullman et al. |
| 2012/0215991 A1 | 8/2012 | Moyer |

OTHER PUBLICATIONS

International Search Report and Written Opinion mailed on Nov. 12, 2014 on application No. PCT/US2014/048480.
International Preliminary report on Patentability and International Search Report and Written Opinion mailed on Nov. 12, 2014, on application No. PCT/US2014/048480.

* cited by examiner

*Primary Examiner* — Cheng-Yuan Tseng
(74) *Attorney, Agent, or Firm* — Lowenstein Sandler LLP

(57) ABSTRACT

Execution-Aware Memory protection technologies are described. A processor includes an instruction fetch unit to fetch instructions of applications executing in a multitasking environment and an execution unit to execute the instructions. A memory protection unit (MPU) enforces memory access control of the applications by defining an instruction region (I-space) and a data region (D-space and linking the I-space to the D-space. When the MPU determining whether an instruction address is within the I-space and whether a data address of a data access operation is within the D-space. The MPU issues a memory protection fault for the data access operation when either the instruction address is not within the I-space or the data address is not within the D-space.

25 Claims, 17 Drawing Sheets

| | | | | MPU Access Control Rules (504 Current Instruction Address) | | |
|---|---|---|---|---|---|---|
| | | Memory Map (502) | | TL-A (0x00-0A) | TL-B (0x0A-0B) | OS (0x0B-0F) |
| I/D SPACE | Code | 0x00.. Trustlet A | entry | rx | rx | rx |
| | | | code | rx | r | r |
| | | 0x0A.. Trustlet B | entry | rx | rx | rx |
| | | | code | r | rx | r |
| | | 0x0B.. OS | entry | rx | rx | rx |
| | | | code | r | r | rx |
| | Data | 0x10.. Trustlet A | data | rw | - | rw |
| | | | stack | rw | - | rw |
| | | 0x1A.. Trustlet B | data | - | rw | rw |
| | | | stack | - | rw | rw |
| | | 0x1B.. OS | data | - | - | rw |
| | | | stack | - | - | rw |
| | Peripherals | 0x20.. MPU | flags | r | r | r |
| | | | region registers (hi) | r | r | r |
| | | | region registers (lo) | r | r | rw |
| | | 0x2A.. Timer | timeout | r | r | rw |
| | | | ISR pointer | r | r | rw |
| | | 0x2B.. ... | | | | |

| Memory Map 500 / 502 | | | MPU Access Control Rules 504 — Current Instruction Address | | |
|---|---|---|---|---|---|
| | | | TL-A (0x00-0A) | TL-B (0x0A-0B) | OS (0x0B-0F) |
| Code | 0x00.. Trustlet A | entry | rx | rx | rx |
| | | code | rx | r | r |
| | 0x0A.. Trustlet B | entry | rx | rx | rx |
| | | code | r | rx | r |
| | 0x0B.. OS | entry | rx | rx | rx |
| | | code | r | r | rx |
| Data (I/D SPACE) | 0x10.. Trustlet A | data | rw | - | rw |
| | | stack | rw | - | rw |
| | 0x1A.. Trustlet B | data | - | rw | rw |
| | | stack | - | rw | rw |
| | 0x1B.. OS | data | - | - | rw |
| | | stack | - | - | rw |
| Peripherals | 0x20.. MPU | flags | r | r | r |
| | | region registers (hi) | r | r | r |
| | | region registers (lo) | r | r | rw |
| | 0x2A.. Timer | timeout | r | r | rw |
| | | ISR pointer | r | r | rw |
| | 0x2B.. ... | | | | |

FIG. 5A

| EA-MPU Access Control 520 | Trustlet A data | Trustlet B data | OS data |
|---|---|---|---|
| Trustlet A code | rw | - | - |
| Trustlet B code | - | rw | - |
| OS code | - | - | rw |

FIG. 5B

EXECUTION-AWARE MEMORY PROTECTION

Embodiments described herein generally relate to processing devices and, more specifically, relate to execution-aware memory protection architectures and operating the same.

BACKGROUND

In computing, memory refers to the physical devices used to store programs (e.g., sequences of instructions) or data (e.g. program state information) on a temporary or permanent basis for use in a computer or other digital electronic devices. The terms "memory," "main memory" or "primary memory" can be associated with addressable semiconductor memory, i.e. integrated circuits consisting of silicon-based transistors, used for example as primary memory in computers.

DESCRIPTION OF EMBODIMENTS

Figure 1:
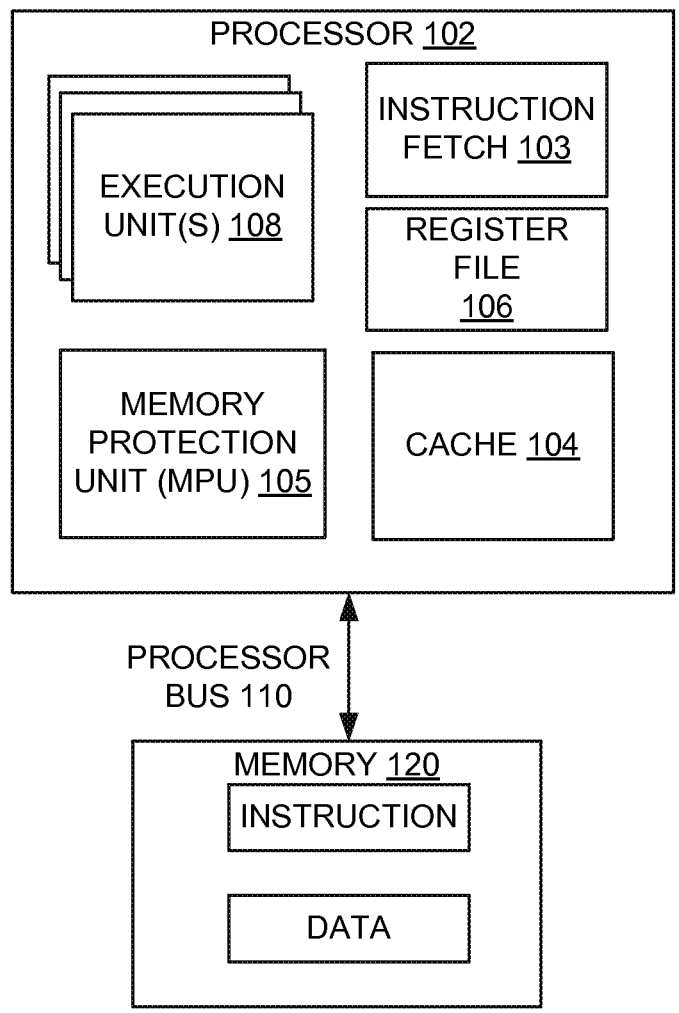
FIG. 1 is a block diagram illustrating a computing system that implements a memory protection unit (MPU) for execution-aware memory protection according to one embodiment.

Execution-aware memory protection technologies are described. A processor includes an instruction fetch unit to fetch instructions of applications executing in a multitasking environment and an execution unit to execute the instructions. A memory protection unit (MPU) enforces memory access control of the applications by defining an instruction region (I-space) and a data region (D-space) and linking the I-space to the D-space. The MPU determines whether an instruction address is within the I-space and whether a data address of a data access operation is within the D-space. The MPU issues a memory protection fault for the data access operation when either the instruction address is not within the I-space or the data address is not within the D-space. In some embodiments, the MPU checks if both are within the defined regions, and in particular, checks whether the data address being accessed by the current instruction is within the D-space and whether the currently executing instruction is within the I-space. When either one of the addresses are not within the defined region, a memory protection fault can be issued. For example, the currently executing instruction should match the I-space region and the data address accessed by the currently executing instruction should match the D-space region. In the case that they have been linked, both of these should match to let the data request be permitted. In other embodiments, as described herein, the MPU can link a first I-space region to a second I-space region. For example, the currently executing instruction should match the first I-space and the next instruction should match the second I-space.

In recent years, sophisticated security extensions have been introduced in common computing platforms to increase their security assurance. Today, the Trusted Platform Module security chip is available for many PCs, laptops and even some tablet PCs targeting business users. Modern CPU models boast complex mechanisms for trusted execution environments such as Intel® TXT technology or ARM Trustzone® technologies. At the lower-end of the computing continuum, resource constraints may preclude the inclusion of such security features and even well-established features, such as virtualization and virtual memory, are often not available. In these environments, it is difficult to provide generic, strong security mechanisms that resist application and operating system failures. The embodiments described herein can provide flexible security architectures for realizing low-cost trusted computing functionality in computing systems, including lower-end computing systems. As described herein, the embodiments may enable a number of stateful, isolated applications to coexist in a multitasking environment, in parallel to an untrusted operating system and application stack.

As described herein, at the lower-end of the computing continuum, computing platforms, e.g. microcontrollers, may implement a Memory Protection Unit (MPU) which enforces memory access control by organizing real, physical memory into a number of memory regions with associated access permissions. MPUs can be used for reliability, providing a mechanism to detect errors ranging from programming bugs to hardware failures. MPUs can also have security applications.

Conventional MPUs are not execution aware in that the MPU enforces access control on instruction memory and data memory, but the MPU treats the instruction memory and the data memory as distinct and there is no link between the instruction memory and data memory. Non-execution aware MPUs require that the privileged software controlling the MPU, such as an operating system (OS), be trusted and immune from compromise. The resultant Trusted Computing Base (TCB) is often too large to provide high security guarantees or assurances, and limits the extension of the OS with non-critical manageability and convenience functions.

The embodiments described herein may enable protection schemes that mark individual memory regions as executable, read-only, read-write, etc., for specific privilege levels e.g. a supervisor and user mode. The embodiments of the MPU enforce memory protection in an execution-aware manner. Rather than treating instruction memory and data memory accesses as distinct, the MPU can link instruction memory to the data memory such that memory protection is enforced depending on the currently executing program code. In additional embodiments, the MPU can prohibit executed program code from switching its control flow to outside of its defined program code region, except by using MPU-authorized interfaces for task (also referred to herein as trustlet) switching or CPU exceptions as described herein. By shifting a level of execution-awareness into hardware, such as in the MPU, the hardware enables a number of trusted, isolated applications (e.g. payment services) to co-exist in parallel to an untrusted operating system and application stack, but with strong security guarantees.

FIG. 1 is a block diagram illustrating a computing system 100 that implements a memory protection unit (MPU) for execution-aware memory protection according to one embodiment. The computing system 100 is formed with a processor 102 that includes one or more execution units 108 to execute an instruction and a memory protection unit 105 that implements one or more features in accordance with one or more embodiments as described herein. The computing system 100 may be any device, but the embodiments described herein can add value for securing memory in low-end devices. For example, the disclosed embodiments may be used for wearable devices (e.g., watches), electronic implants, sensory and control infrastructure devices, controllers, supervisory control and data acquisition (SCADA) systems, form-factor sensitive devices, or the like.

In a further embodiment, the processor 102 includes an instruction fetch unit 103 to fetch instructions for one or more applications executed by the processor 102. In another embodiment, the instruction fetch unit 103 fetches instructions for multiple applications executing in a multitasking environment. These applications may be executing in parallel to an untrusted operating system or application stack. The MPU 105 enforces memory access control for applications that is execution aware as described herein. For example, in one embodiment, the MPU 105 defines an instruction region (I-space) in an I-space register in the register file 106 and a data region (D-space) in a D-space register in the register file 106. Alternatively, the I-space register and D-space register can be part of the MPU 105 itself. The I-space can be defined by an I-space region base address and an I-space region length and the D-space can be defined by a D-space region base address and a D-space region length. The I-space can also be assigned I-space access permissions and the D-space can be assigned D-space access permissions. The MPU 105 links the I-space to the D-space. In other embodiments, as described herein, the MPU 105 can link a first I-space to a second I-space. The MPU 105 receives an instruction address for a first instruction from the instruction fetch unit 103 and a data address of a data access operation for the first instruction from the execution unit 108 (or from the instruction fetch unit 103 or write back unit). The MPU 105 determines whether the instruction address and data address are within the I-space defined by the I-space register and within the D-space defined the D-space register. The MPU 105 issues a memory protection fault for the data access operation when the instruction address and data address are not within the linked I-space and D-space. That is both addresses need to match the respective defined regions when the I-space and D-space are linked. In another embodiment, the MPU 105 issues a memory protection fault when a currently executing instruction is not within the first I-space or the next instruction is not within the second I-space. In other embodiments, a memory protection fault can be issued if matching I/D-space or I/I spaces are not linked or otherwise associated. As illustrated in FIG. 2B, the MPU 105 may include fault logic that is operable to receive the I-space, D-space, instruction address, and data address. The fault logic may also receive an instruction transaction type and a data instruction type as describe herein.

In a further embodiment, a first application performs a first task and a second application performs a second task. The MPU 105 associates the first task to the linked I-space and D-space and prohibits access by the second task to the linked I-space and D-space. The first and second applications may be stateful, isolated applications executing in a multitasking environment in parallel to an untrusted operating system. For example, the operating system performs a third task and the MPU 105 can prohibit access by the second task and third task to the linked I-space and D-space.

Figure 3:
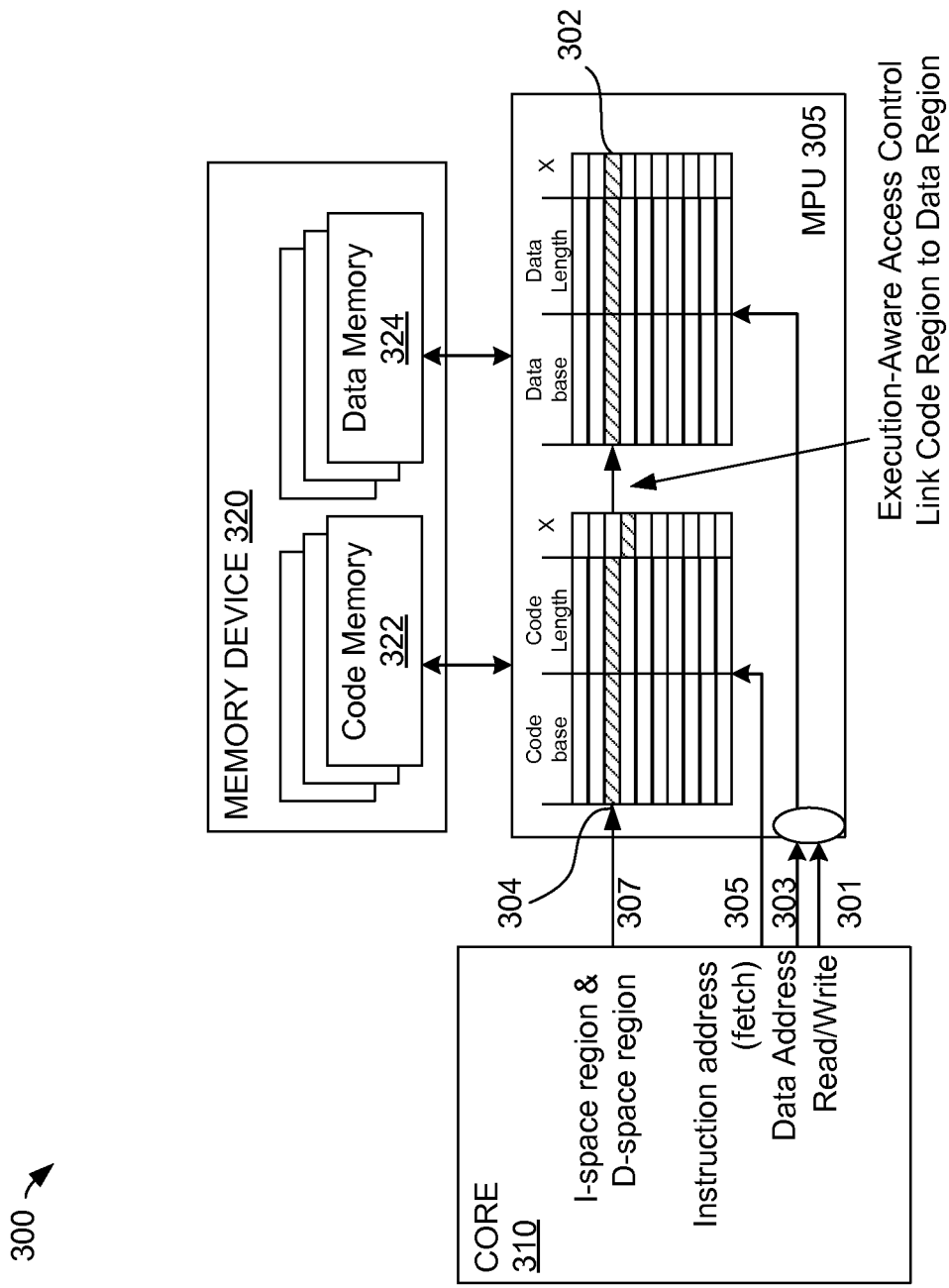
FIG. 3 is a block diagram of an execution-aware MPU according to one embodiment.

In a further embodiment, as illustrated in FIG. 3, the MPU 105 organizes physical memory into multiple protected memory regions, each of the protected memory regions comprising a linked I-space and D-space. The MPU 105 may mark the memory regions with access permissions for a specific privilege level, such as a supervisor mode or a user mode.

In a further embodiment, as illustrated in FIG. 5A, protected I-space regions include an entry vector that restricts how the I-space regions is called or executed by a task corresponding to another one of the other I-space regions.

Additional details regarding the MPU 105 are described in more detail below with respect to FIGS. 2-5C.

Computing system 100 includes a component, such as a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. It should be noted that the execution unit may or may not have a floating point unit. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102. The processor 102 is coupled to the memory 120 via a processor bus 110. A system logic chip, such as a memory controller hub (MCH) may be coupled to the processor bus 110 and memory 120. An MCH can provide a high bandwidth memory path to memory 120 for instruction and data storage and for storage of graphics commands, data and textures. The MCH can be used to direct data signals between the processor 102, memory 120, and other components in the system 100 and to bridge the data signals between processor bus 110, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the MPU 105 can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2A:
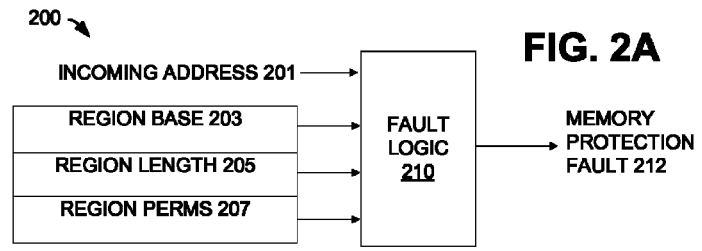
FIG. 2A is a block diagram of fault logic of a MPU for execution-aware memory protection according to one implementation.
Figure 2B:
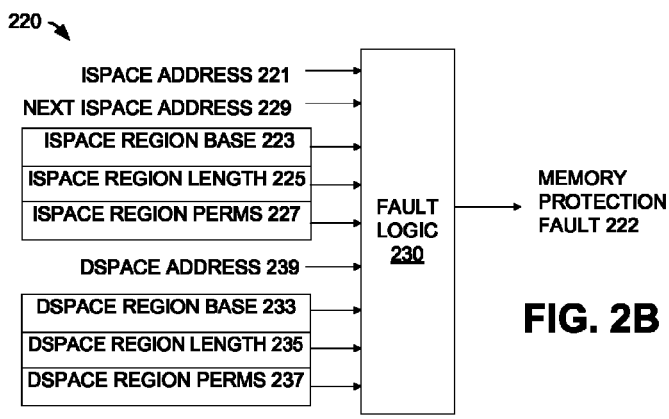
FIG. 2B is a block diagram of fault logic of a MPU for execution-aware memory protection according to another implementation.

Conventional MPUs realize access control by organizing real, physical memory into a number of memory regions with associated access permissions, such as illustrated in FIG. 2A, which illustrates the basic MPU operation for a single protection region.

FIG. 2A is a block diagram of fault logic 210 of a MPU 200 for execution-aware memory protection according to one implementation. The fault logic 210 receives an incoming address 201. The incoming address 201 may be the result of a CPU core instruction's fetch or a CPU core instruction's execution operation which access memory. The incoming address 201 is compared by the fault logic 210 against a protection region defined in terms of the region's base address 203 and region's length 205 and access permissions 207 (e.g., read, write, or execute). The region base address 203, region length 205 and region permissions 207 can be stored in a set of one or more registers. These values may be programmable. If the fault logic 210 determines that a memory access constitutes a protection violation, the fault logic 210 issues a memory protection fault 212 to the system. The memory protection fault 212 can be subsequently handled by code with appropriate privileges or trust levels. Additional protection regions can be supported by scaling up this basic approach within the constraints of the available hardware resources of the processor.

The following embodiments extend the basic functionality described above with respect to FIG. 2A to enforce memory protection in an execution-aware manner. Rather than treating instruction memory accesses and data memory accesses as distinct, the MPUs described herein link instruction memory accesses to data memory access such that memory protection is enforced depending on the currently executing program code. Additionally, as described herein, the MPU can prohibit executed program code from switching its control flow to outside of its defined program code region, except by using MPU-authorized interfaces for task switching or CPU exceptions as described herein.

FIG. 2B is a block diagram of fault logic 230 of a MPU 220 for execution-aware memory protection according to another implementation. The MPU 220 defines a protection region as having an instruction region (I-space) and a data region (D-space). That is, the MPU 220 links an I-space to a D-space to protect the D-space by preventing access by code outside of the protected region. The fault logic 230 receives an instruction address 221 (I-space address) and a data address 239 (D-space address). The I-space address 221 may result from an instruction fetch by an instruction fetch unit of the processor. The D-space address 239 may result from an instruction fetch, a data read, a data write, or a subsequent execution operation by an execution unit of the processor. The protected region is defined in terms of I-space region base address 223, I-space region length 225, I-space region permissions 227 (e.g., read or execute), and corresponding D-space region base address 233, D-space region length 235, D-space region permissions 237). The I-space region base address 223, I-space region length 225, I-space region permissions 227, and corresponding D-space region base address 233, D-space region length 235, D-space region permissions 237 can be stored in a set of one or more registers. These registers may be part of the register file 106 described above with respect to FIG. 1. Alternatively, these registers are stored in the MPU 105 of FIG. 1. Alternatively, these parameters that define the protected region can be stored as part of a memory protection table. The I-space address 221 and D-space address 239 are compared by the fault logic 230 against the protection region.

In determining whether a protection violation has occurred, the MPU 220 determines whether the I-space and D-space addresses resulting from an instruction fetch and subsequent execute operation are within the ranges defined by the respective I-space and D-space region registers. If the fault logic 230 determines that a memory access constitutes a protection violation, the fault logic 230 issues a memory protection fault 222 to the system. The memory protection fault 222 can be subsequently handled by code with appropriate privileges or trust levels. Additional protection regions can be supported by scaling up this basic approach within the constraints of the available hardware resources of the processor.

FIG. 2B shows the block diagram for the execution-aware MPU possessing a single protection region. Further regions are supported by scaling up the number of region registers within the constraints of the available hardware resources of the processor.

In a further embodiment, illustrated in FIG. 2B, in addition to the I-space and D-space address inputs (e. 221 and 239), the fault logic 230 receives a next I-space address 229. The next I-space address 229 can be used to detect control flow excursions outside of the defined protection region.

Figure 2C:
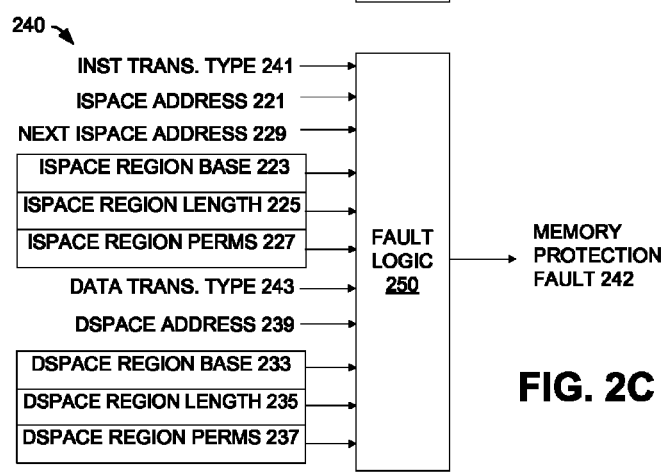
FIG. 2C is a block diagram of fault logic of a MPU for execution-aware memory protection according to another implementation.

FIG. 2C is a block diagram of fault logic 250 of a MPU 240 for execution-aware memory protection according to another implementation. The MPU 240 is similar to the MPU 220 of FIG. 2B as noted by similar reference numbers. The fault logic 250 of MPU 240 also receives an instruction transaction type 241 and a data transaction type 243. These inputs can be used by the fault logic 250 to determine if the type of transaction is permitted or not for the defined protected region. For example, the protected region can have access permission that prevents write operations within the D-space of the protected region. In this scenario, if a task tries to perform a write operation, the data transaction type 243 indicates a write type operation and the fault logic 250 can issue the memory protection fault 242. Similar, the fault logic 250 can issue the memory protection fault 242 when the I-space and D-space addresses resulting from an instruction fetch and subsequent execute operation are not within the ranges defined by the respective I-space and D-space region registers or when the next I-space address 229 results in a control flow excursion outside of the defined protection region as described above with respect to FIG. 2B.

Figure 2D:
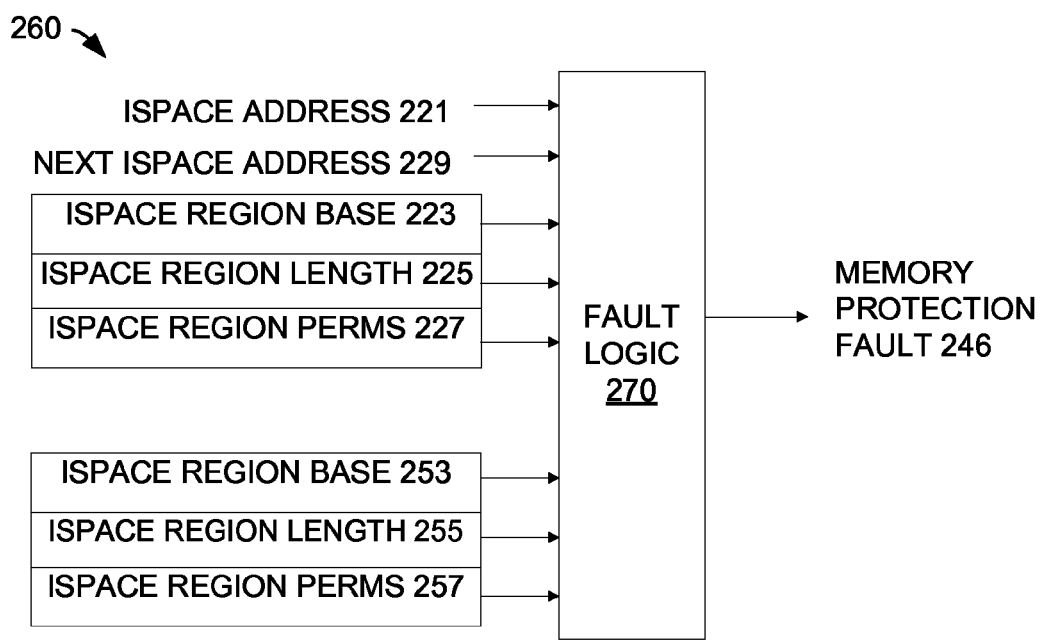
FIG. 2D is a block diagram of fault logic of a MPU for execution-aware memory protection according to another implementation.

FIG. 2D is a block diagram of fault logic 270 of a MPU 260 for execution-aware memory protection according to another implementation. Unlike MPU 220 that performs an execution-aware D-space check, the MPU 260 performs an execution-aware I-space check. The MPU 260 defines a protection region as having two I-spaces. That is, the MPU 260 links an I-space to an I-space to protect the I-space by preventing access by code outside of the protected region. The fault logic 270 receives the I-space address 221 and the D-space address 239 as described above. The protected region is defined in terms of I-space region base address 223, I-space region length 225, I-space region permissions 227 (e.g., read or execute), and corresponding I-space region base address 253, I-space region length 255, I-space region permissions 257). The I-space region base address 223, I-space region length 225, I-space region permissions 227, and corresponding I-space region base address 253, I-space region length 255, I-space region permissions 257 can be stored in a set of one or more registers. Alternatively, these parameters that define the protected region can be stored as part of a memory protection table. The first I-space region (base/length/type) can be matched against the currently executing instruction (I-space address 221) by the fault logic 270. The second I-space region (base address 253 and length 255) may be the requested data (read, write, fetch/execute). The I-space address 221 and D-space address 239 are compared by the fault logic 230 against the protection region. In particular, the fault logic 270 of MPU 260 receives the current instruction I-space address 221 and the other inputs to determine if the access to the I-space region, defined by I-space region base 233 and I-space region length 235, can be accessed by the currently executing instruction 221. When the I-space is not accessible by the currently executing instruction, the fault logic 270 issues a memory protection fault 246. For example, the protected region can have access permission that prevents read/execute operations within the I-space of the protected region. Similar, the fault logic 270 can issue the memory protection fault 246 when the current instruction address and the next instruction address resulting from a read, fetch, execution, or other access type are not within the ranges defined by the respective linked I-space registers. Similarly, transaction types can be part of the inputs of the fault logic 270 as described above with respect to FIG. 2C.

FIG. 3 is a block diagram of an execution-aware MPU (EA-MPU) 300 according to one embodiment. The EA-MPU 300 organizes physical memory of the memory device 320 into code memory 322 and data memory 324. The EA-MPU 300 is coupled between a processor core 310 and a memory device 310. The EA-MPU 300 allows a data region 302 to be linked to a code region 304 (also referred to herein as I-space). In this manner, the EA-MPU 300 can provide execution-aware access control by linking the code region 304 to the data region 302. The EA-MPU 300 receives a transaction type 301 (e.g., read or write operation), a data address 303, and an instruction address 305 (e.g., as a result of an instruction fetch) from the processor core 310. The EA-MPU 300 may also receive a I-space region and D-space region 307 that defines a protected region (e.g., code region 304 and a data region 302). The EA-MPU 300 may define one or more protected regions by linking defined code regions, like code region 304, to corresponding data regions, like data region 302. In one embodiment, the EA-MPU 300 maintains a table that defines multiple code regions, such as using code region base addresses and code region lengths, as well as the access permissions for the code regions. Another table (or the same table) can define multiple data regions, such as using data region base addresses and data region lengths, as well as the access permissions for the data regions. The EA-MPU 300 also links a code region to a data region to provide execution-aware access control as described herein.

In one embodiment, the processor core 310 includes an instruction fetch unit to fetch instructions for applications executing in a multitasking environment. The processor core 310 also includes the execution unit or a write back unit. The EA-MPU 300 enforces memory access control for the applications by defining the code region 304 and the data region 304. The EA-MPU 300 links the code region 304 to the data region. The EA-MPU 300 receives the instruction address 305 for a first instruction, such as from the instruction fetch unit, and the data address 303 of a data access operation for the first instruction. The data address may be received from the execution unit, the write back unit, or even from a decoding unit that decodes the fetched instruction to determine the data address. The EA-MPU 300 determines whether the instruction address 305 and data address 303 are within the code region 304 (e.g., I-space defined by the I-space register or as specified in a table) and within the data region 302 (e.g., D-space defined by the D-space register or as specified in a table). The EA-MPU 300 issues a memory protection fault for the data access operation when the instruction address 305 and data address 303 are not within the protected region, as defined by the code region 302 and the linked data region 302 (e.g., linked I-space and D-space).

In a further embodiment, the EA-MPU 300 associates a first task of a first application to the protected region, as defined by the code region 302 and the linked data region 302. The EA-MPU 300 receives a second instruction address 305 and second data address 303 for a second task being requested by a second application. The EA-MPU 300 can prohibit access to the protected region by the second task because either the second address 305 is not within the code region 304 or the second data address 303 is not within the data region 302, or both are not within the respective regions.

Although FIG. 3 illustrates MPU 305 as linking a code region 304 to a data region 302, in other embodiments, the MPU 305 can link a first code region to a second code region, as described above with respect to FIG. 2D.

Figure 4:
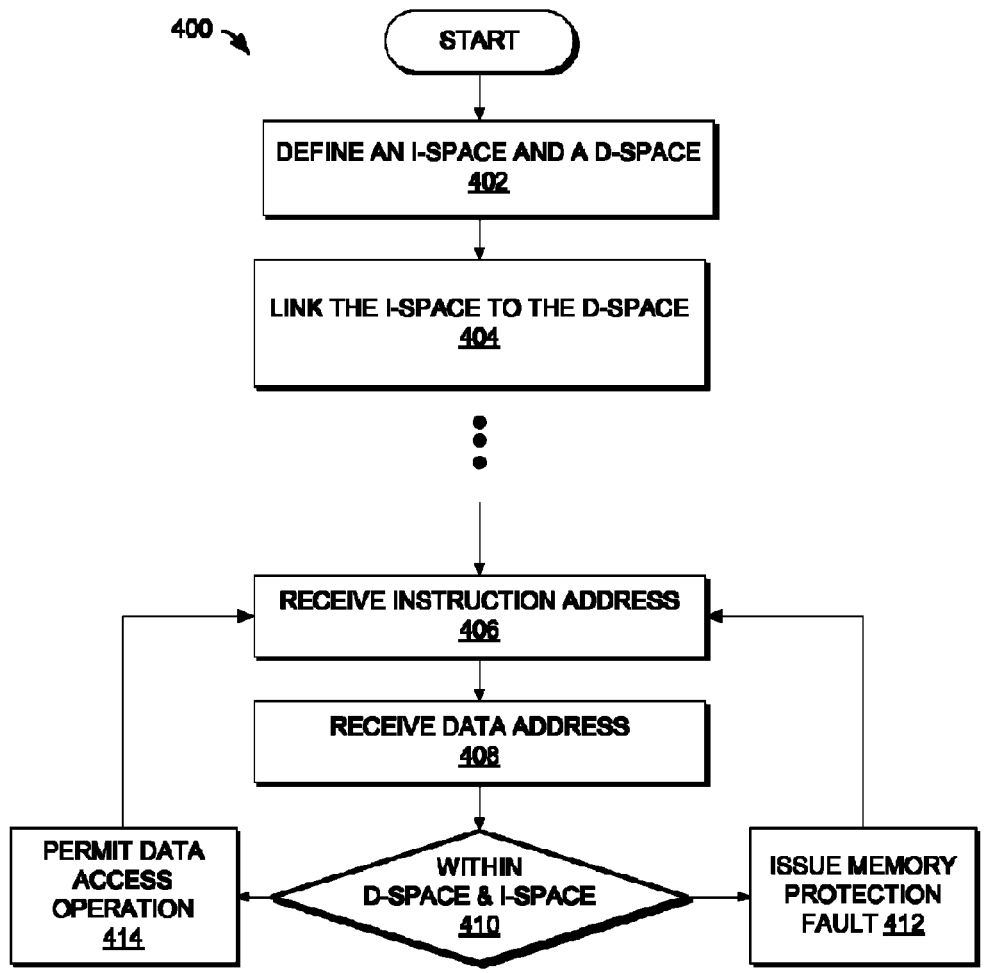
FIG. 4 is a flow diagram of a method for execution-aware memory protection according to one embodiment.

FIG. 4 is a flow diagram of a method for execution-aware memory protection according to one embodiment. Method 400 may be performed by processing logic that may comprise hardware (e.g., circuitry, dedicated logic, programmable logic, microcode, etc.), software (such as operations being performed by the MPU), firmware or a combination thereof. In one embodiment, method 400 is performed by MPU 105 of FIG. 1. In another embodiment, the method 400 is performed by the fault logic 230 of FIG. 2B or fault logic 250 of FIG. 2C. In another embodiment, the method 400 is performed by the MPU 300 of FIG. 3. Alternatively, other components of the computing system 100 may perform some or all of the operations of the method 400.

Referring to FIG. 4, the method 400 begins by the processing logic defining an instruction region (I-space) in an I-space register and a data region (D-space) in a D-space register (block 402). The processing logic links the I-space to the D-space (block 404). It should be noted that not all regions should be linked, as there can be some applications that are protected by traditional memory protection techniques. During subsequent operation, the processing logic receives an instruction address of an instruction (block 406) and receives a data address of a data access operation for the instruction (block 408). The processing logic determines whether the instruction address is within the defined I-space and the data address is within the defined D-space associated with the defined I-space (block 410). The processing logic issues a memory protection fault for the data access operation when either the instruction address is outside the I-space or the data address is outside the D-space (block 412). The processing logic permits the data access operation when the instruction address and data address are within the linked I-space and D-space (block 414). The method 400 can be repeated for additional instructions.

In a further embodiment, the processing logic associates a first task of a first application to the linked I-space and the D-space. The processing logic prohibits access by a second task of a second application to the linked I-space and D-space. In a further embodiment, the processing logic defines I-space access permissions for the I-space and D-access permissions for the D-space. The processing logic may also determine whether an instruction transaction type of the first instruction is permitted by the I-space access permissions and whether a data transaction type of the first instruction is permitted by the D-space access permissions. The processing logic issues the memory protection fault for the data access operation when either the instruction transaction type or the data transaction type is not permitted.

In a further embodiment, the processing logic provides a memory protection table. The memory protection table defines multiple code regions (multiple I-spaces) of the code memory and multiple data regions (multiple D-spaces). The memory protection table links the code regions to the data regions. The memory protection table may also identify access permissions for each of the code regions and for each of data regions. The processing logic controls access to the code memory and the data memory by multiple applications executing in a multitasking environment using the memory protection table. In a further embodiment, the processing logic controls access to the code memory and the data memory by multiple applications that are executing in a multitasking environment in parallel to an untrusted operating system using the memory protection table. In another embodiment, the processing logic assigns a first task of a first application to the I-space and the D-space and prohibits a second task of a second application to the I-space and the D-space.

In one embodiment, the processing logic organizes the physical memory into memory regions each of the memory regions include a linked I-space and D-space. The processing logic marks the memory regions with access permissions for at least one of a supervisor mode or a user mode or other privilege level.

In another embodiment, the processing logic defines an entry vector for the memory region, the entry vector being executable by a task corresponding to another of the other memory regions.

Although FIG. 4 describes linking the I-space to the D-space and performing a D-space check, in other embodiments, the processing logic can link a first code region to a second code region and can perform a I-space check, as described above with respect to FIG. 2D.

Figure 5C:
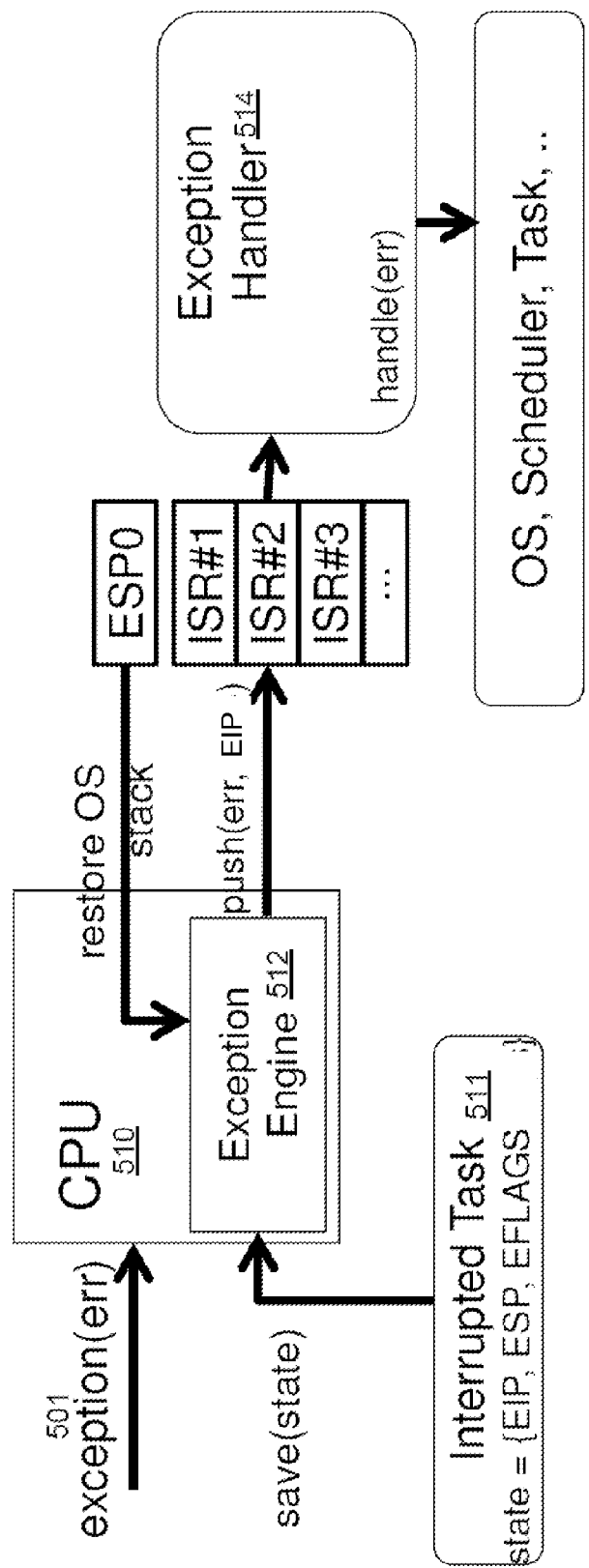
FIG. 5C is a block diagram of an exception engine and an exception handler for exception handling in a system according to one embodiment.

FIG. 5A is a memory protection table 500 according to one embodiment. The memory protection table 500 includes a memory map 502 and access control rules 504 (e.g., access permissions) enforced by an execution-aware MPU, such as MPU 105 or MPU 300. Two tasks, task A and task B, are shown running in parallel with an OS. Write-Access to a task's D-space region (rw) is only permitted for that tasks I-space region, prohibiting other tasks as well as the OS from accessing that tasks memory region. Each task also features an "entry vector", which is the only subset of its I-space that is executable (rx) by other tasks. Enforcement of the entry vector can be achieved by giving the task scheduler (e.g. the untrusted OS scheduler) an appropriate MPU protection region. In this way, the execution-aware MPU can also be used to restrict and authorize context switches between tasks, since individual tasks can only divert control flow within their own I-space region or to the particular pre-defined entry points of other tasks. These task entry points can be programmed such that a well-defined execution of the corresponding new task is assured. A special case of this task switch is inter-process communication (IPC), i.e., the exchange of data between tasks. For this purpose, a task may provide a special entry point which not only continues the regular tasks execution but also interprets and/or stores certain arguments provided in CPU registers before restoring the previous CPU state of the called task. Additional details regarding task entry points and IPC are described below with respect to FIG. 5C.

FIG. 5B is a memory protection table 520 according to another embodiment. The execution-aware MPU uses the memory protection table 520 for enforcing execution-aware memory access control. In this embodiment, there are two applications, trustlet A code and trustlet B code, and operating system (OS) code. The OS code may be untrusted OS code. The memory protection table 520 restricts access control to the data regions corresponding to these codes. That is trustlet A code has read and write access to trustlet A data, trustlet B code has read and write access to trustlet B data, and OS cod has read and write access to OS data. trustlet A code does not have access to trustlet B data or OS data. trustlet B code does not have access to trustlet A data or OS data. OS data does not have access to trustlet A data or trustlet B data. In this manner, the execution-aware MPU can use the actual subject of the transaction for memory control access, instead of just supervisor mode or user mode for memory control access. This allows autonomous code and data separation in hardware, outside of the TCB. With MMIO, the MPU can also scope hardware access to trustlets.

Figure 5D:
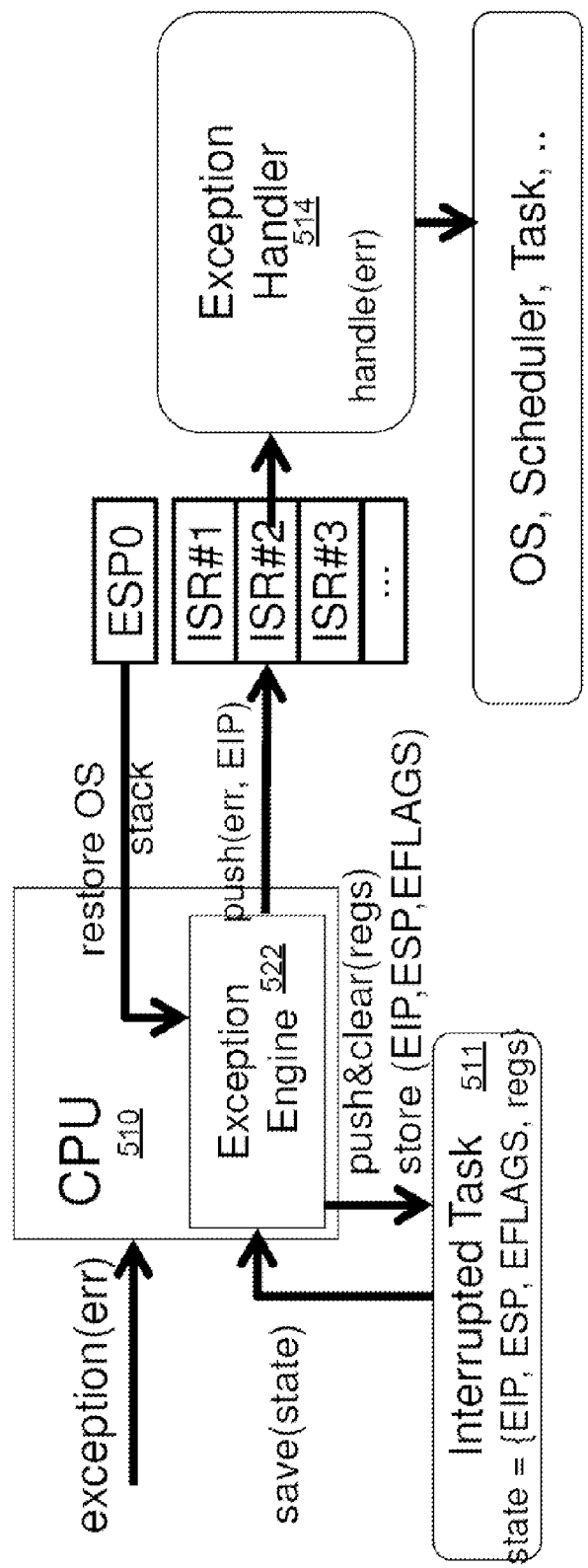
FIG. 5D is a block diagram of an exception engine and an exception handler for secure exception handling in an execution-aware MPU system according to one embodiment.
Figure 5E:
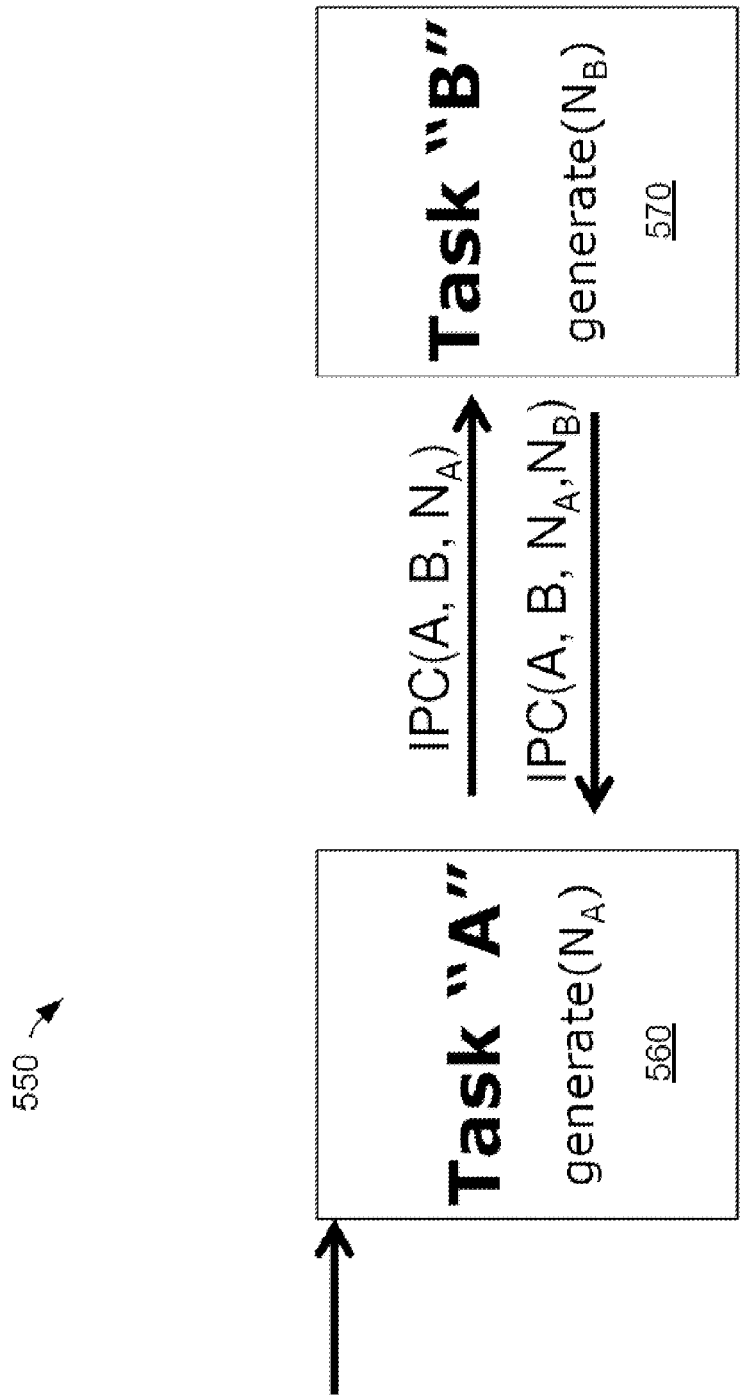
FIG. 5A is a memory protection table according to one embodiment.
FIG. 5B is a memory protection table according to another embodiment.
FIG. 5 E is a diagram illustrating a secure inter-process communication (IPC) in an EA-MPU system according to one embodiment.

The embodiments described herein for system 100 may use mechanisms for exceptions, interrupts and faults. There are scenarios where the CPU register can be leaked to an exception handler (in the operating system). If the operating system is untrusted, this may compromise the security of a trustlet. It should be noted that complete isolation between applications may not be useful in practice as there are instances where trustlets need to communication with one another. In some embodiments, secure channels can be created between trustlets. That is the secure channels may need to be confidential or authenticated. A modified CPU exception handler hardware engine can be used in connection with the execution-aware MPU to maintain the isolation of tasks by not leaking the tasks intermediate state to the exception handler routine (also referred to as interrupt service routing (ISR)). FIGS. 5C-5D illustrate embodiments for exception handling in an EA-MPU system. It should be noted that for the following description task and trustlet are used interchangeably. FIG. 5E illustrates embodiments of secure IPC in an EA-MPU system.

FIG. 5C is a block diagram of an exception engine 512 and an exception handler 514 for exception handling in a system according to one embodiment. During regular treatment of an exception, when an exception 501 is triggered carrying some error information "err" into a CPU 510, the currently running task or trustlet is interrupted ("Interrupted Task") 511. The transient state of the interrupted task 511 consists of various CPU registers (EIP, ESP, EFLAGS, and general purpose registers). The Exception Engine 512 of the CPU 510 normally saves this state and restores or activates some authoritative OS or ISR-specific stack pointer (ESP0). The exception error "err", EIP, ESP and EFLAGS are then stored to the authoritative stack and control is handed over to an exception handler 514 the OS (e.g., interrupt service routined (ISR)). As a result, the OS should be trusted to correctly and confidentially handle the intermediate state of the Interrupted Task 511, and to restore it when continuing execution of the Task.

FIG. 5D is a block diagram of an exception engine 522 and an exception handler 514 for secure exception handling in an execution-aware MPU system according to one embodiment. The EA-MPU systems can be configured for handling exceptions in such a way that the targeted isolation of trustlet memory and trustlet state is maintained. The exception engine 522, which is part of the (assumed secure) CPU 510, stores any sensitive task/trustlet state back to the respective task/trustlet, instead of handing it over to the software exception handler 514 of the OS. The exception engine 522 ensures the integrity and confidentiality of trustlet data and state. Instead of handing the complete state of the Interrupted Task 511 over to the exception handler 514 (ISR), the complete state is stored in protected memory. In particular, a possible instantiation is to store the state inside the memory of the Interrupted Task, putting all general-purpose registers on the Task stack and storing EIP, ESP, EFLAGS in a special, well-known location. Since the respective task's memory (D-space) is protected by the EA-MPU access rules, D-space cannot be accessed or modified once the CPU continues execution in a different I-space region, e.g., that of the ISR or OS scheduler or any other task/trustlet.

FIG. 5E is a diagram illustrating a secure inter-process communication (IPC) 550 in an EA-MPU system according to one embodiment. The IPC 550 is between any two trustlets, such as trustlet A 560 and trustlet B 570 even when there is total memory isolation between trustlet A 560 and trustlet B 570 from the EA-MPU system. For IPC 550, data is stored in CPU registers and a sender trustlet calls an entry vector (also referred to herein as entry point) of a receiver trustlet. There are several "calling conventions" known by which a task or a function within a task can call another task or function. IPC by CPU register is used in the "fast" calling convention of the GCC compiler or in "short IPC" in microkernels. However, only in context of our Secure Exception Handling can such a mechanism provide complete confidentiality and integrity of the transmitted data without assuming a secure (trusted) OS/kernel (Interrupt service routine, ISR).

Inter-process communication (IPC), i.e., the exchange of data between tasks, is a special case of context switching between tasks. To perform IPC, a task or trustlet "A" should not only give control to (call) another task or trustlet "B", but also transmit data to B. For this purpose, consider that in a regular (non-IPC) context switch from trustlet A 560 to trustlet B 570, trustlet A 560 purges its general-purpose CPU registers to prevent information leakage to trustlet B 570. A fixed register, e.g., EAX, can be cleared and EAX can be used to signal the availability of data to trustlet B 570 by setting EAX to non-zero. The transmitted data can then be contained implicitly in EAX and/or other registers, which are typically determined at system design time ("calling convention").

Having control of the CPU, trustlet A 560 can be sure that trustlet B 570 is either immediately executed, or in case of an exception, that all data and state is securely preserved by the Exception Engine, restored and continued when continuing trustlet A 560. Hence, a caller trustlet A 560 has assurance that the IPC is performed only with a particular callee trustlet B 570 and the transmitted data is only available to trustlet B 570. To also assure to trustlet B 570 that a message is coming from a particular trustlet A 560, the IPC message may include an authentication token of trustlet A 560 that can be verified by trustlet B 570. Such an authentication token can be a symmetric shared secret. Such a secret may be embedded into trustlet A and trustlet B at design time, or dynamically generated at runtime using a simple 1-way roundtrip as shown in FIG. 5E.

The embodiments described herein may allow trusted computing-like concepts to be extended into the lower end of the compute continuum, specifically into low-end microcontroller product offerings with a relatively low hardware resource requirement. In addition the invention can co-exist with existing OS while supporting trusted execution of tasks with security guarantees enforced by hardware.

It should be noted that the embodiments of FIGS. 5C-5E are only some techniques for secure exception handling in execution-aware MPU systems, but various other techniques may be used as would be appreciated by one of ordinary skill in the art. For example, the "state" and registers saved in the illustrated embodiments and the order and location of the saved data are of course implementation dependent. The modified operation of the exception engine 512 may also be accomplished using a separate component. The secure exception handling should not be limited to these techniques and these implementations.

Figure 6A:
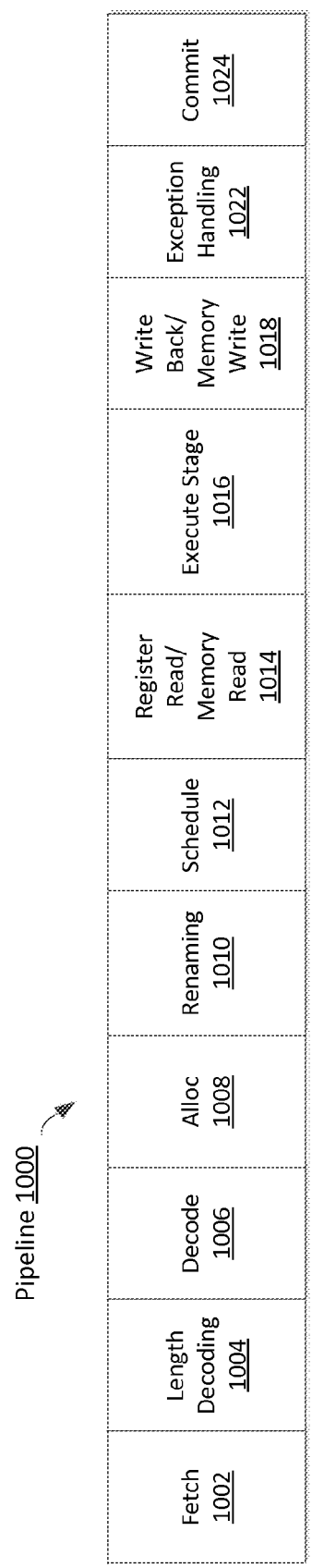
FIG. 6A is a block diagram illustrating an in-order pipeline and a register renaming stage, out-of-order issue/execution pipeline according to one embodiment.

FIG. 6A is a block diagram illustrating a micro-architecture for a processor 600 that implements execution-aware memory protection according to one embodiment. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
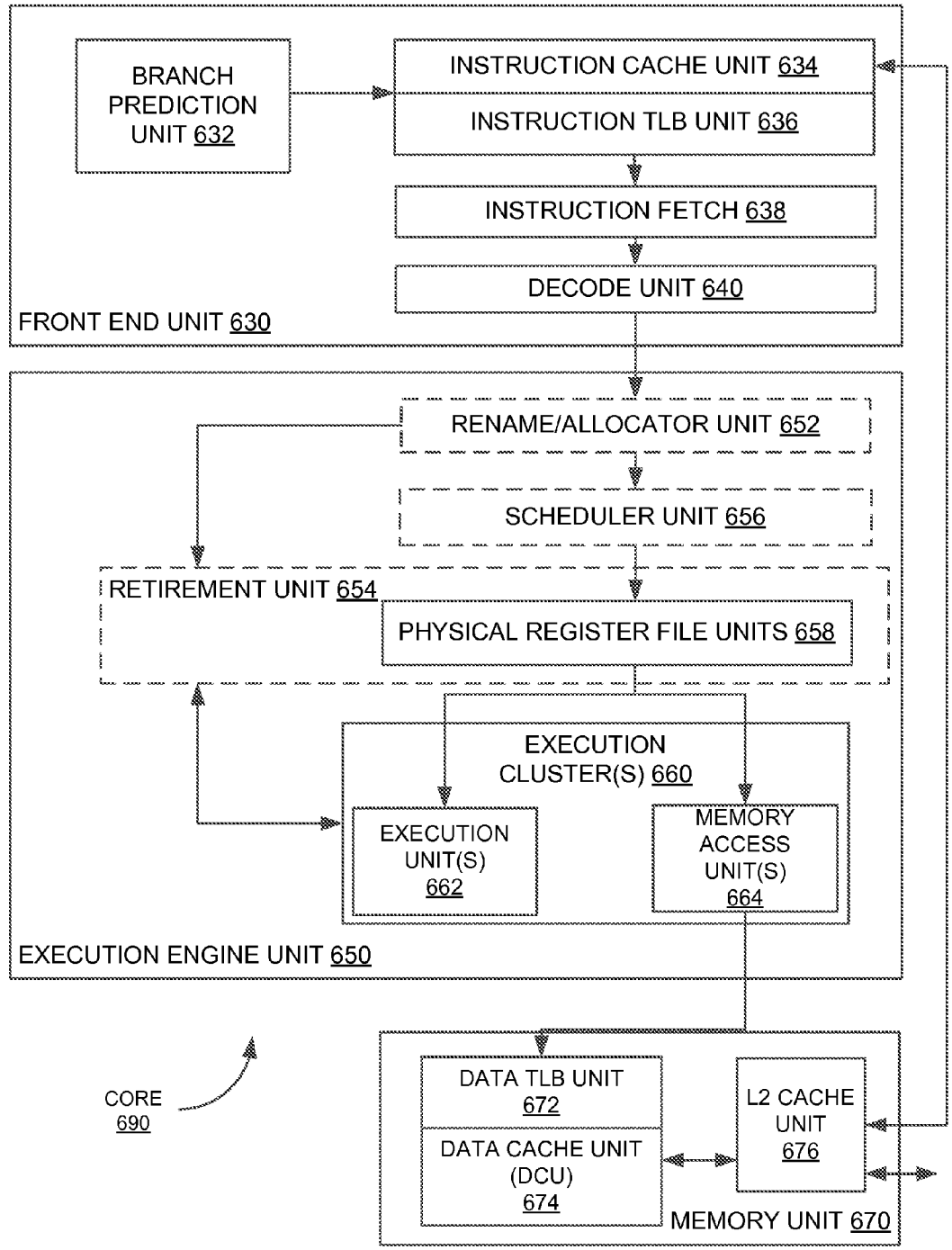
FIG. 6B is a block diagram illustrating a micro-architecture for a processor that implements execution-aware memory protection according to one embodiment.

FIG. 6B is a block diagram illustrating an in-order pipeline and a register renaming stage, out-of-order issue/execution pipeline implemented by processing device 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
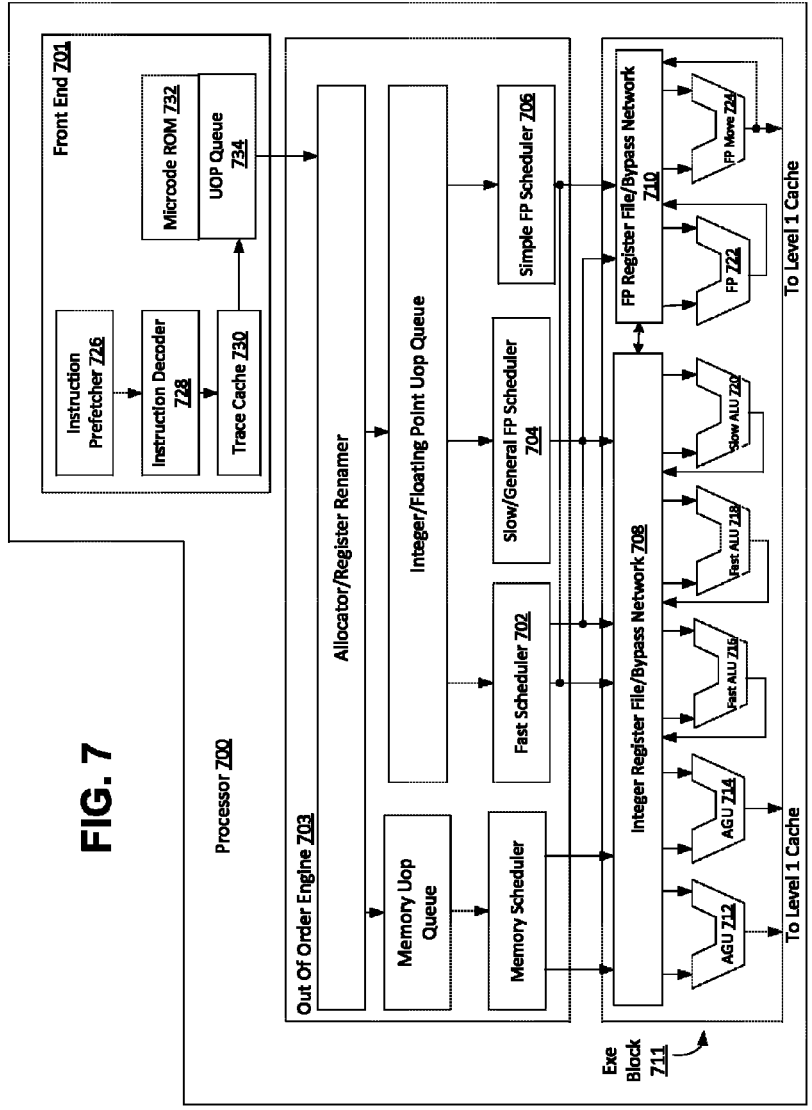
FIG. 7 illustrates a block diagram of the micro-architecture for a processor that includes logic circuits to perform execution-aware memory protection according to one embodiment.

FIG. 7 illustrates a block diagram of the micro-architecture for a processor 700 that includes logic circuits to perform execution-aware memory protection according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement execution-aware memory protection according to one embodiment. In one embodiment, the execution block 711 of processor 700 may include MPU 115, to perform execution-aware memory protection according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
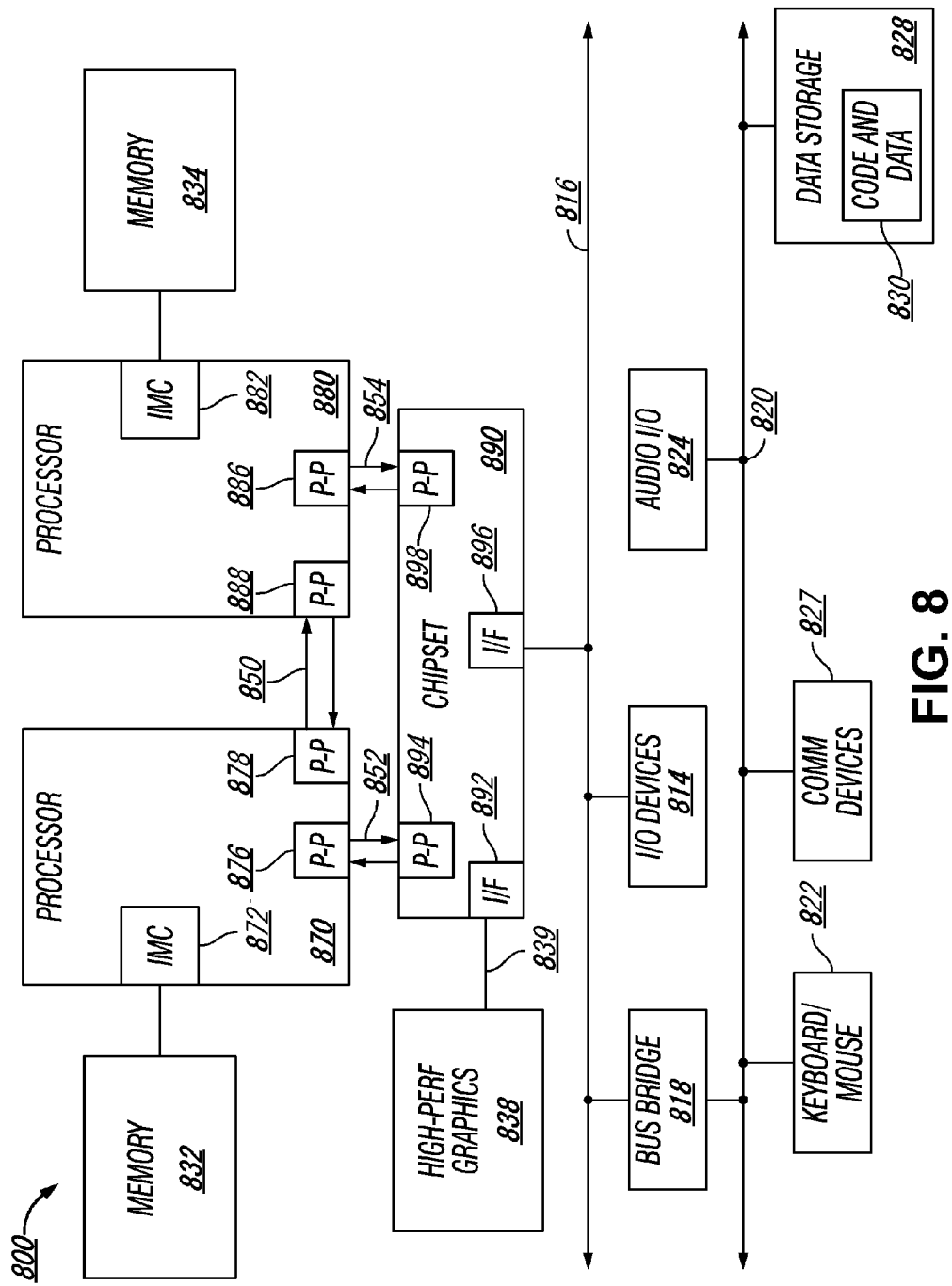
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
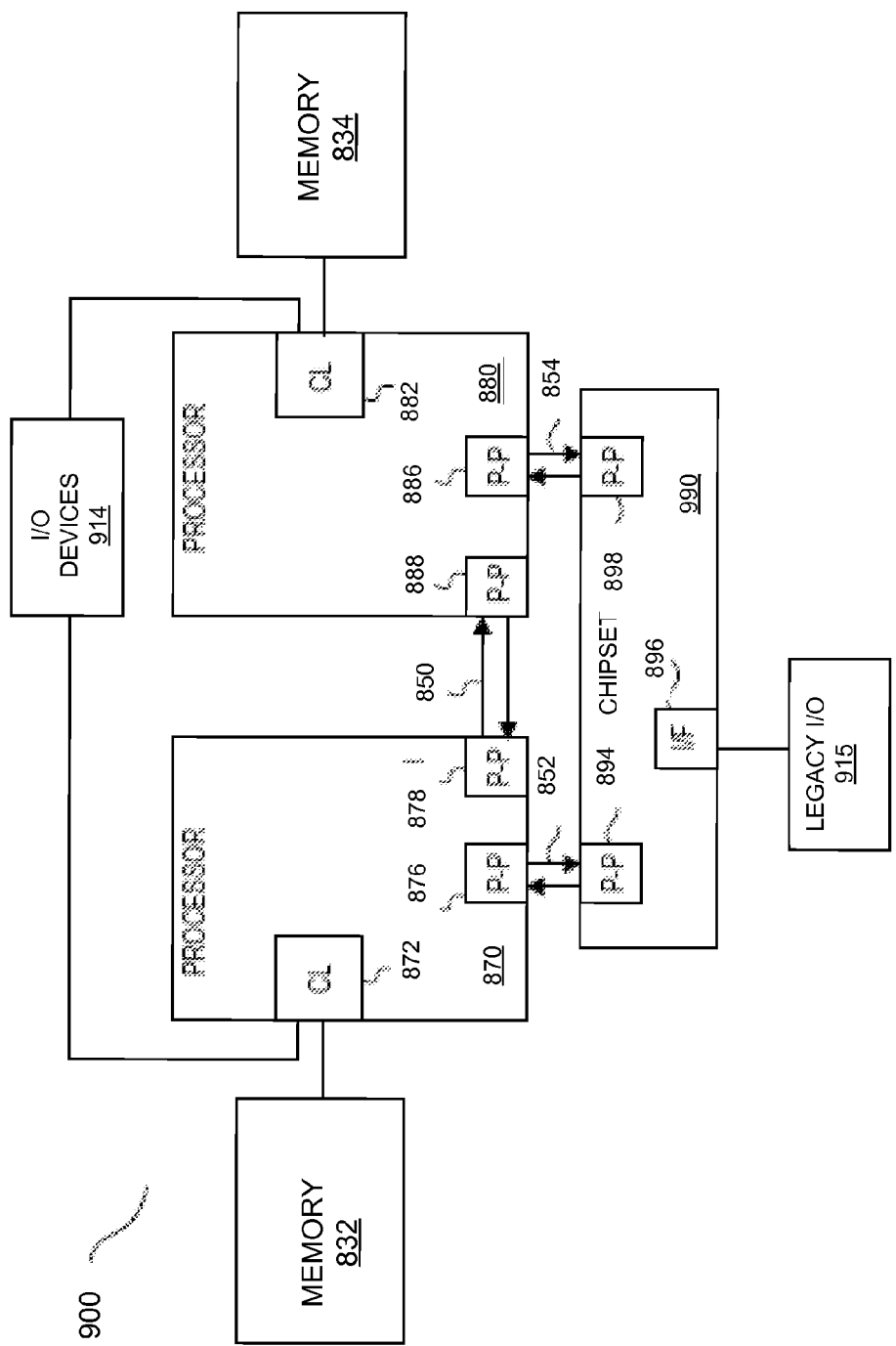
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990.

Figure 10:
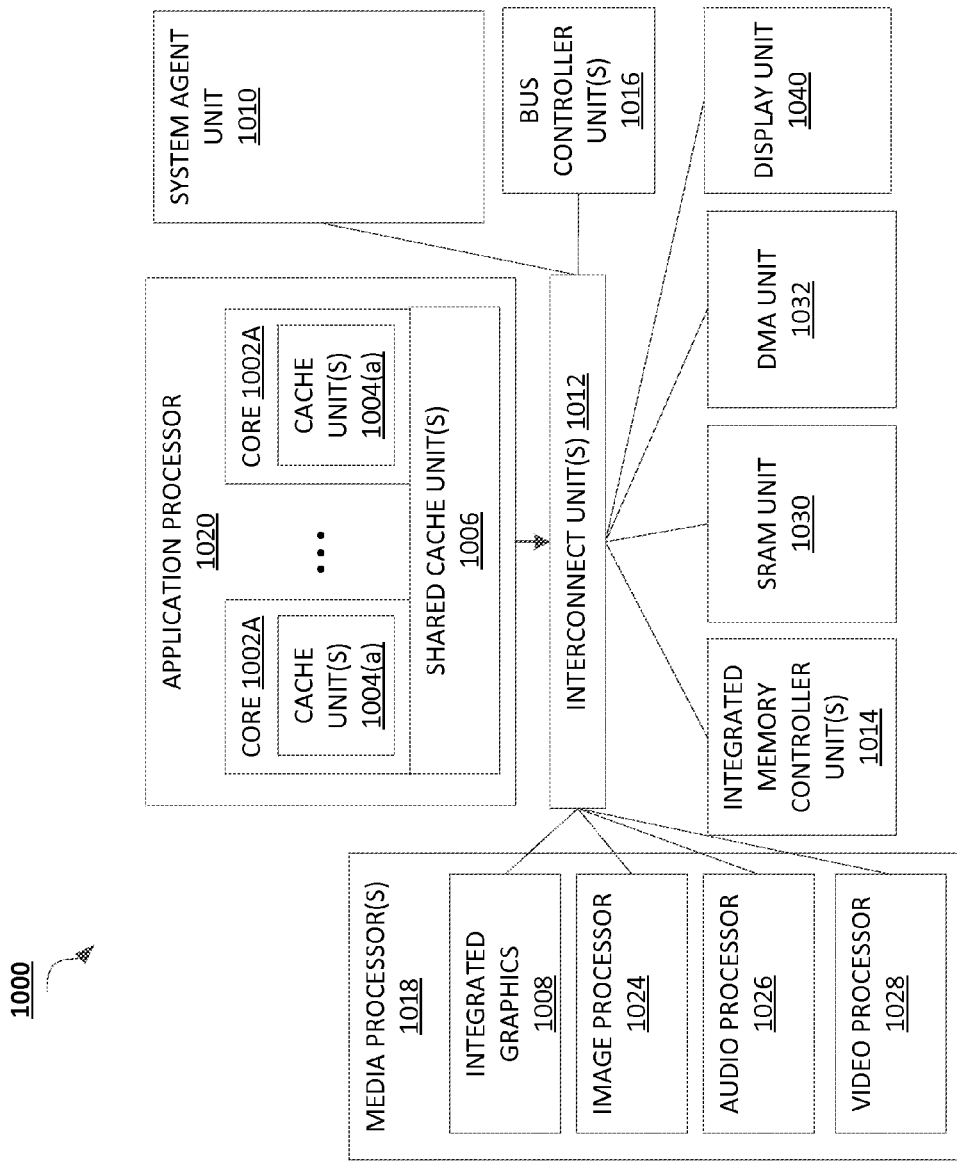
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
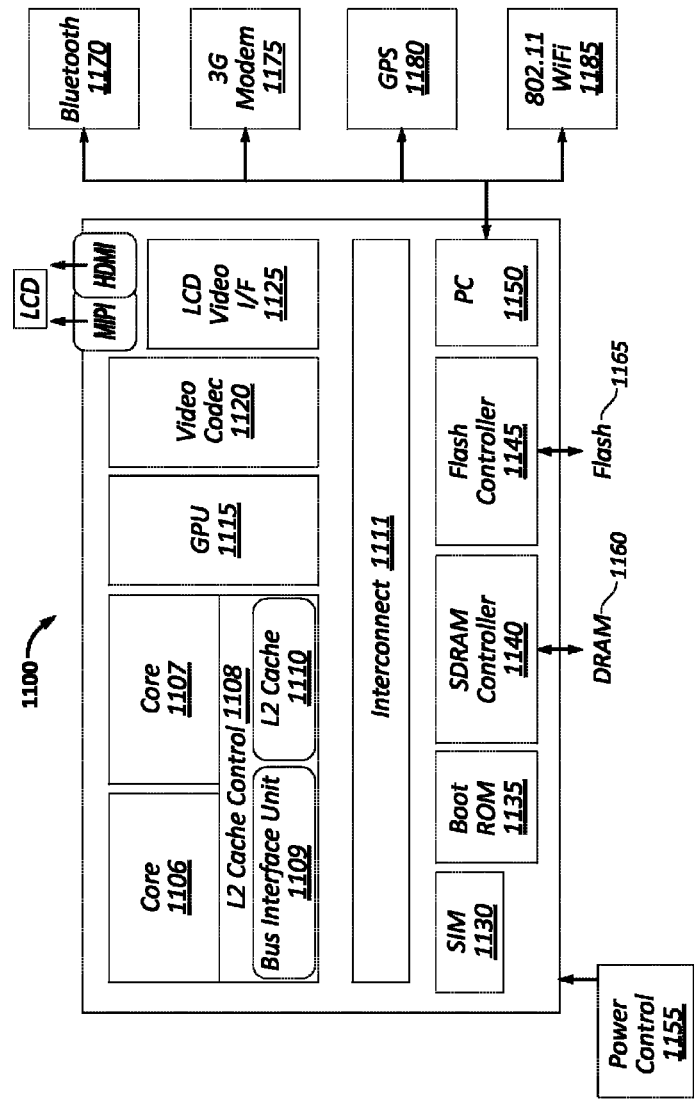
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and WiFi 1185. Note as stated above, a UE includes a radio for communication. As a result, these peripheral communication modules may not all be included. However, in a UE some form of a radio for external communication should be included.

Figure 12:
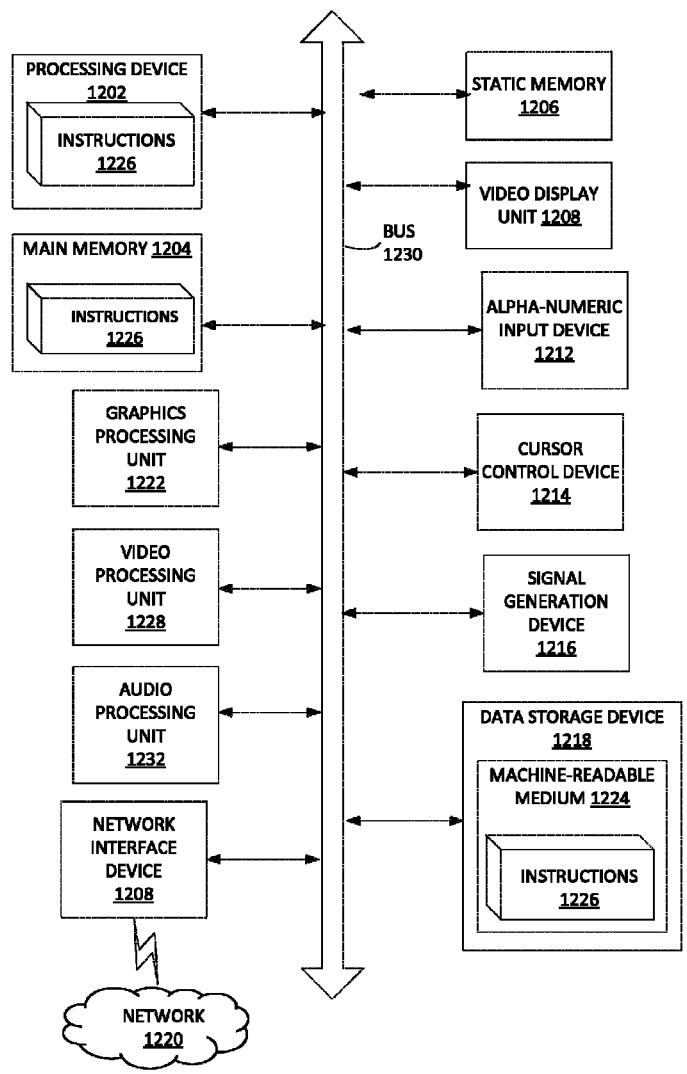
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof. (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) an instruction fetch unit to fetch a plurality of instructions for a plurality of applications executing in a multitasking environment; 2) an execution unit to execute the plurality of instruction; and 3) a memory protection unit (MPU) to enforce memory access control for the plurality of applications, wherein the MPU is operable to: a) define an instruction region (I-space) in an I-space register and a data region (D-space) in a D-space register; b) link the I-space to the D-space; c) receive an instruction address for a first instruction of the plurality of instructions from the instruction fetch unit and a data address of a data access operation for the first instruction from the execution unit; d) determine whether the instruction address and data address are within the I-space defined by the I-space register and within the D-space defined the D-space register; and e) issue a memory protection fault for the data access operation when the instruction address and data address are not within the linked I-space and D-space.

In Example 2, the MPU of Example 1 comprises fault logic operable to receive the I-space, D-space, instruction address, and data address.

In Example 3, in the processor of any one of Examples 1-2, a first application of the plurality of applications performs a first task and a second application of the plurality of applications performs a second task, and the MPU is operable to associate the first task to the linked I-space and D-space, and prohibit access by the second task to the linked I-space and D-space using the fault logic.

In Example 4, the I-space of any one of Examples 1-3, is defined by an I-space region base address and an I-space region length, wherein the D-space is defined by a D-space region base address and a D-space region length.

In Example 5, the MPU of any one of Examples 1-4, is further operable to define I-space access permissions for the I-space and D-space access permissions for the D-space.

In Example 6, the fault logic of any of Examples 1-5, is further operable to receive the I-space access permissions and the D-space access permissions and an instruction transaction type and a data transaction type.

In Example 7, in the processor of any of Examples 1-6, the I-space access permissions comprise read access and execute access and the D-space access permissions comprise read access and write access.

In Example 8, the plurality of applications of any of Examples 1-7, are stateful, isolated applications executing in the multitasking environment in parallel to an untrusted operating system.

In Example 9, in the processor of any of Examples 1-8, a first application of the plurality of applications performs a first task and a second application of the plurality of applications performs a second task, and the untrusted operation system performs a third task, and the MPU is operable to define the linked I-space and D-space for the first task and prohibit access by the second task and the third task to the linked I-space and D-space for the first task using the fault logic.

In Example 10, the MPU of any of Examples 1-9, is operable to organize physical memory into a plurality of memory regions, each of the plurality of memory regions comprising a linked I-space and D-space, wherein the MPU is operable to mark the plurality of memory regions with access permissions for at least one of a supervisor mode or a user mode.

In Example 11, in the processor of any of Examples 1-10, at least one of the plurality of memory regions comprises an entry vector that restricts how the at least one of the plurality of memory regions is called or executed by a task corresponding to another one of the plurality of memory regions.

Various embodiments may have different combinations of the structural features described above. For instance, all optional features of the computing system described above may also be implemented with respect to the method or process described herein and specifics in the examples may be used anywhere in one or more embodiments.

In example 12, a method comprises 1) defining, by a memory protection unit (MPU) of a processor, an instruction region (I-space) in an I-space register and a data region (D-space) in a D-space register; 2) linking the I-space to the D-space; 3) receiving, by the MPU, an instruction address for a first instruction; 4) receiving, by the MPU, a data address of a data access operation for the first instruction; 5) determining whether the instruction address is within the defined I-space; 6) determining whether the data address is within the defined D-space associated with the defined I-space; and 7) issuing a memory protection fault for the data access operation when either the instruction address is outside the I-space or the data address is outside the D-space.

In Example 13, the method of Example 12 further comprises: associating a first task of a first application to the I-space and the D-space; and prohibiting access by a second task of a second application to the linked I-space and D-space.

In Example 14, the method of any of Examples 12-13 further comprises defining I-space access permissions for the I-space and D-access permissions for the D-space.

In Example 15, the method of any of Examples 12-14 further comprises determining whether an instruction transaction type of the first instruction is permitted by the I-space access permissions; determining whether a data transaction type of the first instruction is permitted by the D-space access permissions; and issuing the memory protection fault for the data access operation when either the instruction transaction type or the data transaction type is not permitted.

In Example 16, the method of any of Examples 12-15 further comprises: providing a memory protection table, wherein the memory protection table defines a plurality of code regions of the code memory, including the I-space, and a plurality of data regions of the data memory, including the D-space, wherein the memory protection table links the plurality of code regions to the plurality of data regions, and wherein the memory protection table identifies access permissions for each of the plurality of code regions and the plurality of data regions; and controlling access to the code memory and the data memory by a plurality of applications executing in a multitasking environment using the memory protection table.

In Example 17, the method of any of Examples 12-16 further comprises: providing a memory protection table, wherein the memory protection table defines a plurality of code regions of the code memory, including the I-space, and a plurality of data regions of the data memory, including the D-space, wherein the memory protection table links the plurality of code regions to the plurality of data regions, and wherein the memory protection table identifies access permissions for each of the plurality of code regions and the plurality of data regions; and controlling access to the code memory and the data memory by a plurality of applications executing in a multitasking environment in parallel to an untrusted operating system using the memory protection table.

In Example 18, the method of any of Examples 12-17 further comprises: organizing, by the MPU, physical memory into a plurality of memory regions, each of the plurality of memory regions comprising a linked I-space and D-space; and marking the plurality of memory regions with access permissions for at least one of a supervisor mode or a user mode.

In Example 19, the method of any of Examples 12-18 further comprises defining, by the MPU, an entry vector that restricts how the at least one of the plurality of memory regions is called or executed by a task corresponding to another of the plurality of memory regions.

In Example 20, the method of any of Examples 12-19 further comprises: providing a memory protection table, wherein the memory protection table defines a plurality of code regions of the code memory, including the I-space, and a plurality of data regions of the data memory, including the D-space, wherein the memory protection table links the plurality of code regions to the plurality of data regions, and wherein the memory protection table identifies access permissions for each of the plurality of code regions and the plurality of data regions; assigning a first task of a first application to the I-space and the D-space; and prohibiting a second task of a second application to the I-space and the D-space.

Various embodiments may have different combinations of the structural features described above. For instance, all optional features of the processors and methods described above may also be implemented with respect to a processor described herein and specifics in the examples may be used anywhere in one or more embodiments.

Example 21 is a processor comprising 1) a processor core; 2) a memory device operable to store code memory and data memory; and 3) a memory protection unit MPU coupled between the processor core and the memory device, wherein the MPU is configured to: a) define a code region in the code memory and a data region in the data memory; b) link the code region to the data region; c) receive an instruction address, a data address and a transaction type from the processor core; and d) issue a memory protection fault when either the instruction address is not within the code region or when the data address is not within the data region.

In Example 22, the MPU of Example 21 comprises fault logic, wherein the fault logic is configured to receive the instruction address, the data address and the transaction type, wherein the fault logic is further configured to receive a code region base address, a code region length and code region permissions and a data region base address, a data region length and data region permissions, wherein the code region base address and code region length define the code region and the data region base address and data region length define the data region.

In Example 23, the fault logic of any of Examples 21-22 is further configured to receive a next instruction address concurrently with the instruction address, wherein the MPU is configured to detect control flow excursions outside of the code region.

In Example 24, the MPU of any of Examples 21-23 comprises a memory protection table, wherein the memory protection table defines a plurality of code regions of the code memory and a plurality of data regions of the data memory, wherein the memory protection table links the plurality of code regions to the plurality of data regions, and wherein the memory protection table identifies access permissions for each of the plurality of code regions and the plurality of data regions.

In Example 25, the memory protection table of any of Examples 21-24 identifies a specific privilege level for each of the plurality of code regions and the plurality of data regions.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 26 is a non-transitory, computer-readable storage medium including instructions that, when executed by a processor, cause the processor to perform the method of Examples 12-20.

Example 27 is a system comprising a system on chip (SOC) comprising a plurality of functional units and an execution-aware memory protection unit (EA-MPU), wherein the EA-MPU is configured to define an instruction region (I-space) in an I-space register and a data region (D-space) in a D-space register; link the I-space to the D-space; receive an instruction address for a first instruction of the plurality of instructions from the instruction fetch unit and a data address of a data access operation for the first instruction from the execution unit; determine whether the instruction address and data address are within the I-space defined by the I-space register and within the D-space defined the D-space register; and issue a memory protection fault for the data access operation when the instruction address and data address are not within the linked I-space and D-space.

In Example 28, the SOC of Example 27 further comprises the subject matter of Examples 2-11.

In Example 29, the SOC of Example 27 is further configured to perform the subject matter of Examples 12-20.

Example 30 is an apparatus comprising: an instruction fetch unit to fetch a plurality of instructions for a plurality of applications executing in a multitasking environment; an execution unit to execute the plurality of instruction; means for defining an instruction region (I-space) in an I-space register and a data region (D-space) in a D-space register; means for linking the I-space to the D-space; means for receiving an instruction address for a first instruction of the plurality of instructions from the instruction fetch unit and a data address of a data access operation for the first instruction from the execution unit; means for determining whether the instruction address and data address are within the I-space defined by the I-space register and within the D-space defined the D-space register; and means for issuing a memory protection fault for the data access operation when the instruction address and data address are not within the linked I-space and D-space.

In Example 31, the apparatus of Example 30 further comprises subject matter of Examples 1-11 and 21-25.

Example 32 is a system comprising: a memory device and a processor comprising an execution-aware memory protection unit (EA-MPU), wherein the processor is configured to perform the method of any of Examples 12-20.

In Example 33, the processor of Example 32 further comprises the subject matter of any of Examples 1-11 and 21-25.

Example 34 is a processor comprising: 1) an instruction fetch unit to fetch a plurality of instructions for a plurality of applications executing in a multitasking environment; 2) an execution unit to execute the plurality of instruction; and 3) a memory protection unit (MPU) to enforce memory access control for the plurality of applications, wherein the MPU is operable to: a) define a first instruction region (I-space) in a first I-space register and a second I-space in a second I-space register; b) link the first I-space to the second I-space; c) receive an instruction address for a first instruction of the plurality of instructions from the instruction fetch unit and a next instruction address for a second instruction of the plurality of instruction from the instruction fetch unit; d) determine whether the instruction address and next instruction address are within the first I-space defined by the first I-space register and within the second I-space defined the second I-space register; and e) issue a memory protection fault when the instruction address and next instruction address are not within the linked first I-space and second I-space.

In Example 35, the MPU of Example 34, comprises fault logic operable to receive the first I-space, second I-space, instruction address, and next instruction address.

In Example 36, in any of the Examples 34-35, a first application of the plurality of applications performs a first task, wherein a second application of the plurality of applications performs a second task, wherein the MPU is operable to associate the first task to the linked first I-space and second I-space, and wherein the MPU is operable to prohibit access by the second task to the linked first I-space and second I-space using the fault logic.

In Example 37, in any of the Examples 34-36, the first I-space is defined by a first I-space region base address and a first I-space region length, wherein the second I-space is defined by a second I-space region base address and a second I-space region length.

In Example 38, the MPU in any of the Examples 34-37, is further operable to define first I-space access permissions for the first I-space and second I-space access permissions for the second I-space.

In Example 39, in any of the Examples 34-38, the fault logic is further operable to receive the first I-space access permissions and the second I-space access permissions and an instruction transaction type and a next instruction type.

In Example 40, in any of the Examples 34-39, the first and second I-space access permissions comprise read access and execute access.

In Example 41, in any of the Examples 34-40, the plurality of applications are stateful, isolated applications executing in the multitasking environment in parallel to an untrusted operating system.

In Example 42, in any of the Examples 34-41, a first application of the plurality of applications performs a first task, wherein a second application of the plurality of applications performs a second task, wherein the untrusted operation system performs a third task, wherein the MPU is operable to define the linked first I-space and second I-space for the first task, and wherein the MPU is operable to prohibit access by the second task and the third task to the linked first I-space and second I-space for the first task using the fault logic.

In Example 43, in any of the Examples 34-42, the MPU is operable to organize physical memory into a plurality of memory regions, at least one the plurality of memory regions comprising a linked I-space and D-space and at least one of the plurality of memory regions comprising the linked first I-space and second I-space, wherein the MPU is operable to mark the plurality of memory regions with access permissions for at least one of a supervisor mode or a user mode.

In Example 44, in any of the Examples 34-43, at least one of the plurality of memory regions comprises an entry vector that restricts how the at least one of the plurality of memory regions is called or executed by a task corresponding to another one of the plurality of memory regions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to execution-aware memory protection in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed.

In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
an instruction fetch unit to fetch a plurality of instructions for a plurality of applications executing in a multitasking environment;
an execution unit to execute the plurality of instruction; and
a memory protection unit (MPU) to enforce memory access control for the plurality of applications, wherein the MPU comprises a memory protection table, wherein the memory protection table defines a plurality of code regions of the code memory and a plurality of data regions of the data memory, wherein the memory protection table links the plurality of code regions to the plurality of data regions, and wherein the memory protection table identifies access permissions for each of the plurality of code regions and the plurality of data regions, wherein the memory protection table identifies a specific privilege level for each of the plurality of code regions and the plurality of data regions, wherein the MPU is to:
define an instruction region (I-space) in an I-space register and a data region (D-space) in a D-space register;
link the I-space to the D-space;
receive an instruction address for a first instruction of the plurality of instructions from the instruction fetch unit and a data address of a data access operation for the first instruction from the execution unit;
determine whether the instruction address and data address are within the I-space defined by the I-space register and within the D-space defined the D-space register; and
issue a memory protection fault for the data access operation when the instruction address and data address are not within the I-space and D-space.

2. The processor of claim 1, wherein the MPU comprises fault logic to receive the I-space, D-space, instruction address, and data address.

3. The processor of claim 2, wherein a first application of the plurality of applications performs a first task, wherein a second application of the plurality of applications performs a second task, wherein the MPU is to associate the first task to the linked I-space and D-space, and wherein the MPU is to prohibit access by the second task to the linked I-space and D-space using the fault logic.

4. The processor of claim 2, wherein the I-space is defined by an I-space region base address and an I-space region length, wherein the D-space is defined by a D-space region base address and a D-space region length.

5. The processor of claim 4, wherein the MPU is further to define I-space access permissions for the I-space and D-space access permissions for the D-space.

6. The processor of claim 5, wherein the fault logic is further to receive the I-space access permissions and the D-space access permissions and an instruction transaction type and a data transaction type.

7. The process of claim 6, wherein the I-space access permissions comprise read access and execute access, wherein the D-space access permissions comprise read access and write access.

8. The processor of claim 1, wherein the plurality of applications are stateful, isolated applications executing in the multitasking environment in parallel to an untrusted operating system.

9. The processor of claim 8, wherein a first application of the plurality of applications performs a first task, wherein a second application of the plurality of applications performs a second task, wherein the untrusted operation system performs a third task, wherein the MPU is to define the linked I-space and D-space for the first task, and wherein the MPU is to prohibit access by the second task and the third task to the linked I-space and D-space for the first task using the fault logic.

10. The processor of claim 1, wherein the MPU is to organize physical memory into a plurality of memory regions, each of the plurality of memory regions comprising a linked I-space and D-space, wherein the MPU is to mark the plurality of memory regions with access permissions for at least one of a supervisor mode or a user mode.

11. The processor of claim 10, wherein at least one of the plurality of memory regions comprises an entry vector that restricts how the at least one of the plurality of memory regions is called or executed by a task corresponding to another one of the plurality of memory regions.

12. A method comprising:
defining, by a memory protection unit (MPU) of a processor, an instruction region (I-space) in an I-space register and a data region (D-space) in a D-space register;
linking the I-space to the D-space;
receiving, by the MPU, an instruction address for a first instruction;
receiving, by the MPU, a data address of a data access operation for the first instruction;
determining whether the instruction address is within the defined I-space;
determining whether the data address is within the defined D-space associated with the defined I-space;
issuing a memory protection fault for the data access operation when either the instruction address is outside the I-space or the data address is outside the D-space;
defining I-space access permissions for the I-space and D-access permissions for the D-space; and
providing a memory protection table, wherein the memory protection table defines a plurality of code regions of the code memory, including the I-space, and a plurality of data regions of the data memory, including the D-space, wherein the memory protection table links the plurality of code regions to the plurality of data regions, and wherein the memory protection table identifies access permissions for each of the plurality of code regions and the plurality of data regions.

13. The method of claim 12, further comprising:
associating a first task of a first application to the I-space and the D-space; and
prohibiting access by a second task of a second application to the linked I-space and D-space.

14. The method of claim 12, further comprising:
determining whether an instruction transaction type of the first instruction is permitted by the I-space access permissions;
determining whether a data transaction type of the first instruction is permitted by the D-space access permissions; and
issuing the memory protection fault for the data access operation when either the instruction transaction type or the data transaction type is not permitted.

15. The method of claim 12, further comprising
controlling access to the code memory and the data memory by a plurality of applications executing in a multitasking environment using the memory protection table.

16. The method of claim 12, further comprising
controlling access to the code memory and the data memory by a plurality of applications executing in a multitasking environment in parallel to an untrusted operating system using the memory protection table.

17. The method of claim 12, further comprising:
organizing, by the MPU, physical memory into a plurality of memory regions, each of the plurality of memory regions comprising a linked I-space and D-space; and
marking the plurality of memory regions with access permissions for at least one of a supervisor mode or a user mode.

18. The method of claim 17, further comprising defining, by the MPU, an entry vector that restricts how the at least one of the plurality of memory regions is called or executed by a task corresponding to another of the plurality of memory regions.

19. The method of claim 12, further comprising:
assigning a first task of a first application to the I-space and the D-space; and
prohibiting a second task of a second application to the I-space and the D-space.

20. A processor comprising:
a processor core;
a memory device to store code memory and data memory; and
a memory protection unit MPU coupled between the processor core and the memory device, wherein the MPU comprises a memory protection table, wherein the memory protection table defines a plurality of code regions of the code memory and a plurality of data regions of the data memory, wherein the memory protection table links the plurality of code regions to the plurality of data regions, and wherein the memory protection table identifies access permissions for each of the plurality of code regions and the plurality of data regions, wherein the memory protection table identifies a specific privilege level for each of the plurality of code regions and the plurality of data regions, wherein the MPU is configured to:
define a code region in the code memory and a data region in the data memory;
link the code region to the data region;
receive an instruction address, a data address and a transaction type from the processor core; and
issue a memory protection fault when either the instruction address is not within the code region or when the data address is not within the data region.

21. The processor of claim 20, wherein the MPU comprises fault logic, wherein the fault logic is configured to receive the instruction address, the data address and the transaction type, wherein the fault logic is further configured to receive a code region base address, a code region length and code region permissions and a data region base address, a data region length and data region permissions, wherein the code region base address and code region length define the code region and the data region base address and data region length define the data region.

22. The processor of claim 21, wherein the fault logic is further configured to receive a next instruction address concurrently with the instruction address, wherein the MPU is configured to detect control flow excursions outside of the code region.

23. A method comprising:
defining, by a memory protection unit (MPU) of a processor, an instruction region (I-space) in an I-space register and a data region (D-space) in a D-space register;
linking the I-space to the D-space;
receiving, by the MPU, an instruction address for a first instruction;
receiving, by the MPU, a data address of a data access operation for the first instruction;
determining whether the instruction address is within the defined I-space;
determining whether the data address is within the defined D-space associated with the defined I-space;
issuing a memory protection fault for the data access operation when either the instruction address is outside the I-space or the data address is outside the D-space;
defining I-space access permissions for the I-space and D-access permissions for the D-space;
determining whether an instruction transaction type of the first instruction is permitted by the I-space access permissions;
determining whether a data transaction type of the first instruction is permitted by the D-space access permissions; and
issuing the memory protection fault for the data access operation when either the instruction transaction type or the data transaction type is not permitted.

24. The method of claim 23, further comprising:
determining whether an instruction transaction type of the first instruction is permitted by the I-space access permissions;
determining whether a data transaction type of the first instruction is permitted by the D-space access permissions; and
issuing the memory protection fault for the data access operation when either the instruction transaction type or the data transaction type is not permitted.

25. The method of claim 23, further comprising:
organizing, by the MPU, physical memory into a plurality of memory regions, each of the plurality of memory regions comprising a linked I-space and D-space; and
marking the plurality of memory regions with access permissions for at least one of a supervisor mode or a user mode.

* * * * *